United States Patent
Tanji

(10) Patent No.: US 12,141,222 B2
(45) Date of Patent: Nov. 12, 2024

(54) COMMUNICATION PERMISSION LIST GENERATION DEVICE, COMMUNICATION PERMISSION LIST GENERATION METHOD, AND NON-TRANSITORY COMPUTER READABLE-MEDIUM

(71) Applicant: Mitsubishi Electric Corporation, Tokyo (JP)

(72) Inventor: Masamichi Tanji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 204 days.

(21) Appl. No.: 18/072,001

(22) Filed: Nov. 30, 2022

(65) Prior Publication Data

US 2023/0087540 A1    Mar. 23, 2023

Related U.S. Application Data

(63) Continuation of application No. PCT/JP2020/027765, filed on Jul. 17, 2020.

(51) Int. Cl.
*G06F 16/957* (2019.01)
*G06F 21/55* (2013.01)
(Continued)

(52) U.S. Cl.
CPC .......... *G06F 16/9574* (2019.01); *G06F 21/55* (2013.01); *H04L 12/2803* (2013.01); *H04L 63/1416* (2013.01)

(58) Field of Classification Search
CPC ...... G06F 40/14; G06F 40/123; G06F 40/205; G06F 16/9574; G06F 21/55;
(Continued)

(56) References Cited

U.S. PATENT DOCUMENTS

2015/0066239 A1   3/2015   Mabuchi
2015/0191135 A1   7/2015   Ben Noon et al.
(Continued)

FOREIGN PATENT DOCUMENTS

EP   2 795 879 A1   10/2014
EP   2 892 199 A1   7/2015
(Continued)

OTHER PUBLICATIONS

German Office Action for German Application No. 11 2020 007 204.5, dated Oct. 5, 2023, with English translation.
(Continued)

*Primary Examiner* — Kyung H Shin
(74) *Attorney, Agent, or Firm* — Birch, Stewart, Kolasch & Birch, LLP

(57) ABSTRACT

A communication permission list generation device 611 includes a communication specification analysis unit to generate from a communication specification 621, a detection rule including period information for a communication message, a communication permission list output unit 613 to generate a pre-update communication permission list 624 including the detection rule, a communication data analysis unit 614 to acquire a period range of a communication message from communication data 622 acquired from a vehicle network, and a communication permission list update unit 615 to update the period information in the detection rule based on the period range. A communication permission list update unit updates, based on a period range of another communication message for which period information has been updated, period information in a detection rule for a communication message for which period information has not been updated.

12 Claims, 14 Drawing Sheets

(51) Int. Cl.
*H04L 9/40* (2022.01)
*H04L 12/28* (2006.01)

(58) Field of Classification Search
CPC ..... G06F 21/554; G06F 21/567; H04L 67/02; H04L 67/5681; H04L 63/1416; H04L 63/101; H04L 63/0227; H04L 9/36; H04L 63/0263; H04L 63/145
See application file for complete search history.

(56) References Cited

U.S. PATENT DOCUMENTS

| | | |
|---|---|---|
| 2015/0191136 A1 | 7/2015 | Ben Noon et al. |
| 2015/0191151 A1 | 7/2015 | Ben Noon et al. |
| 2015/0195297 A1 | 7/2015 | Ben Noon et al. |
| 2016/0323287 A1 | 11/2016 | Kishikawa et al. |
| 2016/0373449 A1 | 12/2016 | Haga et al. |
| 2017/0147812 A1 | 5/2017 | Ujiie et al. |
| 2017/0259761 A1 | 9/2017 | Ben Noon et al. |
| 2017/0279622 A1 | 9/2017 | Yamaguchi et al. |
| 2017/0341604 A1 | 11/2017 | Ben Noon et al. |
| 2017/0341605 A1 | 11/2017 | Ben Noon et al. |
| 2017/0355326 A1 | 12/2017 | Ben Noon et al. |
| 2018/0015888 A1 | 1/2018 | Ben Noon et al. |
| 2018/0029539 A1 | 2/2018 | Ben Noon et al. |
| 2018/0029541 A1 | 2/2018 | Ben Noon et al. |
| 2018/0144119 A1 | 5/2018 | Kishikawa et al. |
| 2018/0159870 A1 | 6/2018 | Tanabe et al. |
| 2018/0167360 A1 | 6/2018 | Maeda et al. |
| 2018/0219832 A1 | 8/2018 | Maeda et al. |
| 2018/0294991 A1 | 10/2018 | Tsurumi et al. |
| 2018/0295147 A1 | 10/2018 | Haga et al. |
| 2018/0316584 A1 | 11/2018 | Ujiie et al. |
| 2019/0111863 A1 | 4/2019 | Ben Noon et al. |
| 2019/0149561 A1 | 5/2019 | Maeda et al. |
| 2019/0149562 A1 | 5/2019 | Maeda et al. |
| 2019/0263336 A1 | 8/2019 | Haga et al. |
| 2019/0294783 A1 | 9/2019 | Ujiie et al. |
| 2020/0195472 A1 | 6/2020 | Tsurumi et al. |
| 2020/0389475 A1 | 12/2020 | Maeda et al. |
| 2020/0396238 A1 | 12/2020 | Haga et al. |
| 2021/0090442 A1 | 3/2021 | Haga et al. |
| 2021/0112062 A1 | 4/2021 | Shimizu et al. |
| 2021/0117537 A1 | 4/2021 | Ujiie et al. |
| 2021/0133309 A1 | 5/2021 | Kishikawa et al. |
| 2021/0144124 A1 | 5/2021 | Maeda et al. |
| 2021/0194902 A1 | 6/2021 | Maeda et al. |
| 2021/0226872 A1 | 7/2021 | Ujiie et al. |
| 2023/0089171 A1 | 3/2023 | Haga et al. |

FOREIGN PATENT DOCUMENTS

| | | | |
|---|---|---|---|
| EP | 2 892 200 A1 | 7/2015 | |
| EP | 2 892 201 A1 | 7/2015 | |
| EP | 2 892 202 A1 | 7/2015 | |
| EP | 3 246 841 A1 | 11/2017 | |
| EP | 3 248 844 A1 | 11/2017 | |
| EP | 3 249 855 A1 | 11/2017 | |
| EP | 3 346 647 A1 | 7/2018 | |
| EP | 3 358 800 A1 | 8/2018 | |
| EP | 3 361 673 A1 | 8/2018 | |
| EP | 3 393 086 A1 | 10/2018 | |
| EP | 3 393 089 A1 | 10/2018 | |
| EP | 3 402 128 A1 | 11/2018 | |
| EP | 3 413 536 A1 | 12/2018 | |
| EP | 3 605 966 A1 | 2/2020 | |
| EP | 3 606 004 A1 | 2/2020 | |
| EP | 3 609 138 A1 | 2/2020 | |
| EP | 3 609 139 A1 | 2/2020 | |
| EP | 3 621 246 A1 | 3/2020 | |
| EP | 3 697 031 A1 | 8/2020 | |
| EP | 3 754 940 A1 | 12/2020 | |
| EP | 3605966 B1 * | 1/2021 | ......... H04L 12/2803 |
| EP | 3 783 859 A1 | 2/2021 | |
| EP | 3 796 603 A1 | 3/2021 | |
| EP | 3 813 333 A1 | 4/2021 | |
| EP | 3 968 575 A1 | 3/2022 | |
| EP | 4 064 614 A1 | 9/2022 | |
| JP | 2013-131907 A | 7/2013 | |
| JP | 2015-136107 A | 7/2015 | |
| JP | 2016-134913 A | 7/2016 | |
| JP | 2016-134914 A | 7/2016 | |
| JP | 6054010 B2 | 12/2016 | |
| JP | 2017-17608 A | 1/2017 | |
| JP | 2017-73765 A | 4/2017 | |
| JP | 2017-111796 A | 6/2017 | |
| JP | 2017-112594 A | 6/2017 | |
| JP | 2017-126978 A | 7/2017 | |
| JP | 2017163504 A * | 9/2017 | |
| JP | 2018-182724 A | 11/2018 | |
| JP | 2018-182725 A | 11/2018 | |
| JP | 6584733 B2 | 10/2019 | |
| JP | 2020-5289 A | 1/2020 | |
| WO | WO 2013/093591 A1 | 6/2013 | |
| WO | WO-2015058546 A1 * | 4/2015 | ......... G06F 16/9574 |
| WO | WO-2016114077 A1 * | 7/2016 | ............. G06F 21/55 |
| WO | WO 2018/077483 A1 | 5/2018 | |
| WO | WO-2019004101 A1 * | 1/2019 | ......... H04L 12/2803 |

OTHER PUBLICATIONS

International Search Report (PCT/ISA/210) issued in PCT/JP2020/027765, dated Oct. 13, 2020.

* cited by examiner

Fig. 3

MESSAGE FORMAT

| ID | DLC | DATA FIELD |
|---|---|---|

DATA FIELD FORMAT

| SIGNAL 1 | SIGNAL 2 | ... | SIGNAL N |
|---|---|---|---|

Fig. 4

COMMUNICATION PERMISSION LIST 221

| DETECTION RULE NUMBER | STATUS | ID | DLC | SIGNAL CONDITION | PERIOD CONDITION (ms) |
|---|---|---|---|---|---|
| 1 | RUNNING | 0x10 | 8 | {0bit. 8. 0-10}, {8bit. 16. 10-500} ⋮ | 90-110 |
| 2 | RUNNING | 0x20 | 8 | {0bit. 8. 0-5}, ⋮ | 90-110 |
| 3 | RUNNING | 0x30 | 4 | {0bit. 2. 0-3}, ⋮ | NONE |
| 4 | RUNNING | 0x40 | 8 | {0bit. 16. 0-1000} ⋮ | 90-110 |
| 5 | RUNNING | 0x50 | 8 | {0bit. 4. 0-15}, ⋮ | 90-110 |

Fig. 8

```
COMMUNICATION SPECIFICATION 621

DEVICE INFORMATION (IN-VEHICLE DEVICE NAME)

MESSAGE INFORMATION 1 (MESSAGE ID, DLC, TRANSMISSION SOURCE IN-VEHICLE DEVICE NAME, AND THE LIKE)
SIGNAL INFORMATION 1-1 (SIGNAL NAME, START BIT, LENGTH, POSSIBLE VALUES, AND THE LIKE)
SIGNAL INFORMATION 1-2

MESSAGE INFORMATION 2
SIGNAL INFORMATION 2-1
SIGNAL INFORMATION 2-2
SIGNAL INFORMATION 2-3
...

MESSAGE TYPE INFORMATION (MESSAGE ID, MESSAGE TYPE (EVENT, PERIOD, EVENT & PERIOD), AND THE LIKE)
...

MESSAGE PERIOD INFORMATION (MESSAGE ID, PERIOD)
...
```

INTERNALLY GENERATED FILE 1400

| ID | DLC | SIGNAL CONDITION | | | | PERIOD CONDITION (ms) |
|---|---|---|---|---|---|---|
| | | START BIT | LENGTH | MINIMUM VALUE | MAXIMUM VALUE | |
| 0x10 | 8 | 0 | 8 | 0 | 10 | 100 |
| | | 8 | 16 | 10 | 500 | |
| | | : | : | : | : | |
| 0x20 | 8 | 0 | 8 | 0 | 5 | 100 |
| | | : | : | : | : | |
| 0x30 | 4 | 0 | 2 | 0 | 3 | - |
| | | : | : | : | : | |
| 0x40 | 8 | 0 | 16 | 0 | 1000 | 100 |
| | | : | : | : | : | |
| 0x50 | 8 | 0 | 4 | 0 | 15 | 100 |
| | | : | : | : | : | |

INTERNALLY GENERATED FILE 1700

| ID | PERIOD RANGE (ms) | |
|---|---|---|
| | MINIMUM PERIOD | MAXIMUM PERIOD |
| 0x20 | 98.4 | 104.5 |
| 0x40 | 93.8 | 110.3 |

Fig. 19

UPDATED COMMUNICATION PERMISSION LIST 625

| DETECTION RULE NUMBER | STATUS | ID | DLC | SIGNAL CONDITION | PERIOD CONDITION (ms) |
|---|---|---|---|---|---|
| 1 | RUNNING | 0x10 | 8 | {0bit. 8. 0-10}. {8bit. 16. 10-500}. ⋮ | 90-<u>105</u> |
| 2 | RUNNING | 0x20 | 8 | {0bit. 8. 0-5}. ⋮ | <u>98-105</u> |
| 3 | RUNNING | 0x30 | 4 | {0bit. 2. 0-3}. ⋮ | NONE |
| 4 | RUNNING | 0x40 | 8 | {0bit. 16. 0-1000}. ⋮ | <u>93-111</u> |
| 5 | RUNNING | 0x50 | 8 | {0bit. 4. 0-15}. ⋮ | <u>90-115</u> |

COMMUNICATION PERMISSION LIST GENERATION DEVICE, COMMUNICATION PERMISSION LIST GENERATION METHOD, AND NON-TRANSITORY COMPUTER READABLE-MEDIUM

CROSS-REFERENCE TO RELATED APPLICATION

This application is a continuation application of International Application PCT/JP2020/027765, filed on Jul. 17, 2020, all of which is hereby expressly incorporated by reference into the present application.

TECHNICAL FIELD

The present disclosure relates to a technology for detecting an illegal message flowing through a network.

BACKGROUND ART

In recent years, research and other sources have revealed attacks that deceive the control relating to running or the like of a vehicle by transmitting from an illegal in-vehicle device or the like installed inside the vehicle, an illegal message impersonating a message flowing through a vehicle network. For this reason, it is expected that vehicles will increasingly be equipped with an illegal communication detection function that monitors a message flowing through the vehicle network and detects an illegal message.

There are many fixed and periodic messages flowing through the vehicle network. Accordingly, an application of a whitelist-type illegal communication detection function is expected, in which information relating to normal messages is maintained as a whitelist and a message violating the whitelist is detected as an illegal message. The whitelist-type illegal communication detection function has an advantage in that the list does not need to be updated frequently compared with a blacklist-type illegal communication detection function that maintains information relating to illegal messages.

However, in order to apply the whitelist-type illegal communication detection function, it is necessary to correctly define in the whitelist, all normal messages that may flow in the network. If the whitelist is all manually created by humans, there is a high workload and is also a disadvantage such as occurrence of an omission or a description error.

Therefore, Patent Literature 1 discloses a technology for creating a whitelist by leaning and analyzing communication data collected from a network.

Further, Patent Literature 2 discloses a technology for defining permitted communication such as a pair of a transmission destination address and a transmission source address or a protocol and for defining the permitted communication as a communication permission list (whitelist), by utilizing the fact that network communication of an industrial control system is fixed.

CITATION LIST

Patent Literature

Patent Literature 1: JP 6054010 B2
Patent Literature 2: JP 6584733 B2

SUMMARY OF INVENTION

Technical Problem

When generating a whitelist for a vehicle network, based on Patent Literature 1, it is conceivable that communication data flowing through an actual vehicle network is acquired and used to generate the whitelist. However, in this case, information such as the format of the payload part of the acquired communication data is necessary to generate the whitelist. Even when automatically generating the whitelist from the acquired communication data, it is necessary to manually set information required to analyze the communication data. Further, it is difficult to verify whether or not all normal communication data is included in the acquired communication data.

On the other hand, based on Patent Literature 2, it is conceivable that a whitelist is generated from communication specifications that define specifications of communication data flowing through a vehicle network. Since the communication specifications define information such as the format of the payload part and possible values of each data part, it is possible to generate the whitelist from the communication specifications. In this case, it is not necessary to manually set up information for analysis. However, there is also information that cannot be determined from the communication specifications, such as a period error range of a periodic message. Alternatively, for communication data in which a value range used in the real environment is more limited than a value range specified in the communication specifications, it is defined as a rule that allows a wider value range in terms of specifications. If the value range of the rule defined in the whitelist is too wide, detection accuracy is decreased and possibility of not properly detecting an illegal message is increased.

Therefore, the present disclosure aims to reduce possibility of erroneously detecting an illegal message as a valid message by correcting a communication permission list generated from a communication specification.

Solution to Problem

A communication permission list generation device to generate a communication permission list to be used by an illegal communication detection function that is installed in a vehicle network, characterized in that the communication permission list generation device according to the present disclosure includes: a communication specification analysis unit to generate from a communication specification that defines a specification of a normal communication message flowing through the vehicle network, a detection rule including period information that defines a period of the communication message; a communication permission list output unit to generate a communication permission list including the detection rule generated by the communication specification analysis unit; a communication data analysis unit to analyze communication data acquired from the vehicle network and to acquire from the communication data, a period range indicating a range of the period of the communication message; and a communication permission list update unit to update based on the period range of the communication message acquired by the communication data analysis unit, the period information in the detection rule for the communication message included in the communication permission list, wherein when there is a detection rule for a communication message for which the period information has not been updated in the communication permission list, the communication permission list update unit selects as a reference message, another communication message for which the period information has been updated and based on a period range of the reference message, updates the period information in the detection rule for the communication message.

Advantageous Effects of Invention

The present disclosure has an effect for reducing possibility of erroneously detecting an illegal message as a valid message by correcting a communication permission list generated from a communication specification.

BRIEF DESCRIPTION OF DRAWINGS

FIG. 3 is a message format of a communication message according to the present invention.

FIG. 4 is an example of a format of a communication permission list 221 according to the present invention.

FIG. 8 is an example of a format of a communication specification 621 according to the present invention.

FIG. 19 is an example of an updated communication permission list 625 according to the present invention.

DESCRIPTION OF EMBODIMENTS

Hereinafter, a best embodiment for implementing the present invention will be described with reference to the drawings. The following embodiments are not intended to limit the invention according to the claims. Further, not all combinations of features to be described in the embodiments are essential for the solution to the invention. In the embodiments and drawings, the same reference signs are given to the same elements or elements corresponding to each other. The description of elements with the same reference signs is omitted or simplified as appropriate.

Figure 1:
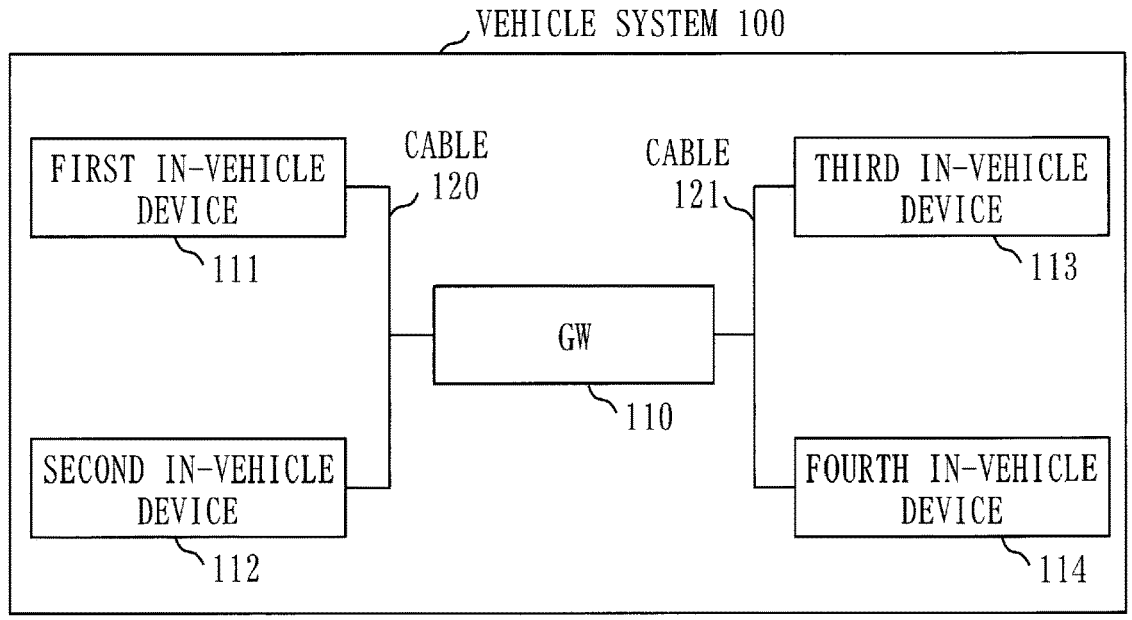
FIG. 1 is a system configuration diagram of a vehicle system 100 according to the present invention.

FIG. 1 is a system configuration diagram of a vehicle system to which a whitelist-type illegal communication detection function according to the present invention is applied.

A vehicle system 100 according to the present intention includes a Gateway (GW) 110, a first in-vehicle device 111, a second in-vehicle device 112, a third in-vehicle device 113, and a fourth in-vehicle device 114. The vehicle system 100 may include dozens to hundreds of in-vehicle devices.

The GW 110, the first in-vehicle device 111, and the second in-vehicle device 112 communicate with each other via a cable 120. The GW 110, the third in-vehicle device 113, and the fourth in-vehicle device 114 communicate with each other via a cable 121. The first in-vehicle device 111 and the second in-vehicle device 112 as well as the third in-vehicle device 113 and the fourth in-vehicle device 114 communicate with each other via the cable 120, the GW 110, and the cable 121. The cable 120 and the cable 121 are cables supporting Controller Area Network (CAN) communication which is standardly used for in-vehicle communication. Since the CAN is broadcast communication, the GW 110 is possible to receive all communication flowing through the cable 120 and the cable 121. The whitelist-type illegal communication detection function according to the present invention is installed in the GW 110.

Figure 2:
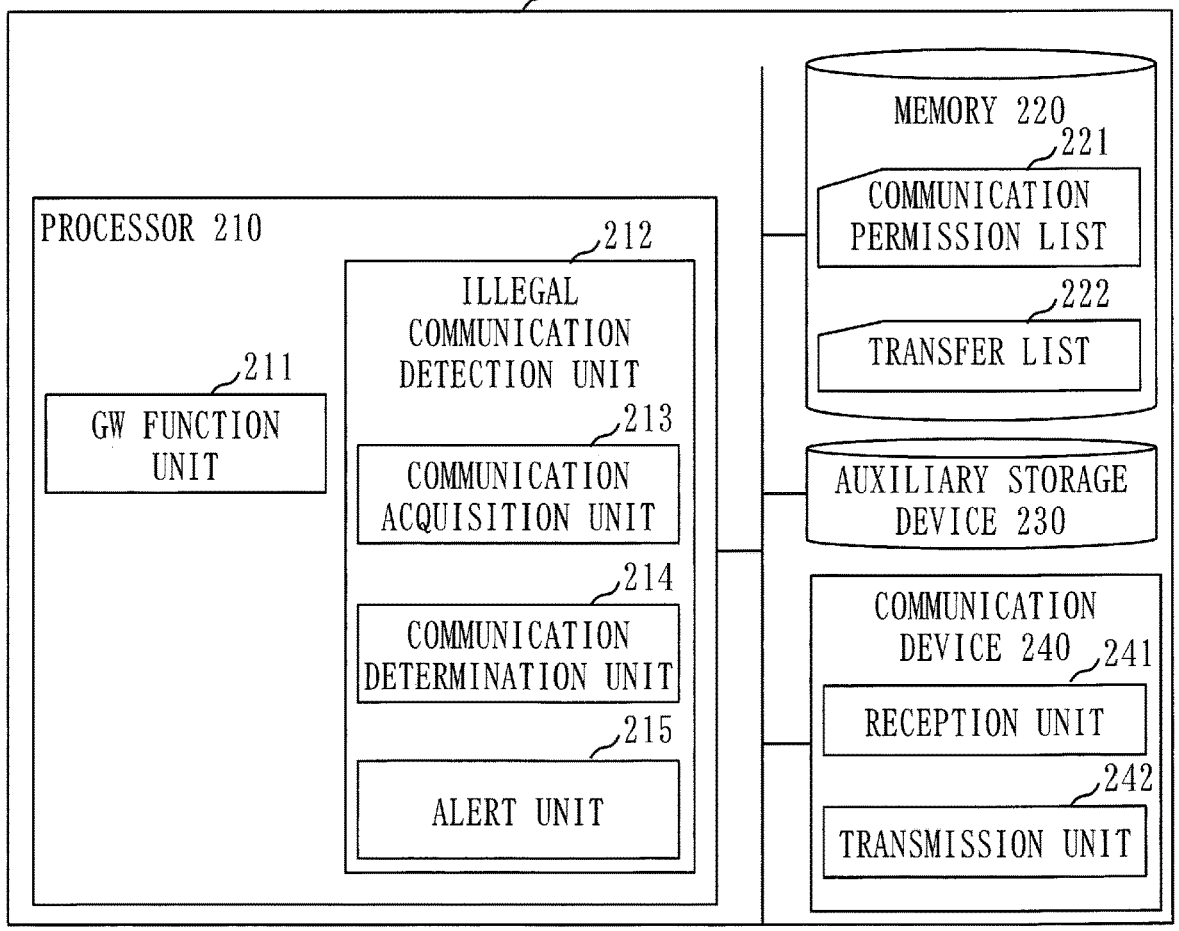
FIG. 2 is a configuration diagram of a GW 110 according to the present invention.

FIG. 2 is a configuration diagram of the GW 110 according to the present invention.

The GW 110 is a computer including pieces of hardware such as a processor 210, a memory 220, an auxiliary storage device 230, and a communication device 240. These pieces of hardware are connected to each other via signal lines.

The processor 210 is an Integrated Circuit (IC) that performs processing and controls other hardware. Specifically, the processor 210 is a CPU, a DSP, or a GPU. The CPU stands for Central Processing Unit, the DSP stands for Digital Signal Processor, and the GPU stands for Graphics Processing Unit.

The memory 220 is a volatile storage device. The memory 220 is also called a main storage device or a main memory. Specifically, the memory 220 is a Random Access Memory (RAM).

The auxiliary storage device 230 is a non-volatile storage device. Specifically, the auxiliary storage device 230 is a ROM, an HDD, or a flash memory. The ROM stands for Read Only Memory and the HDD stands for Hard Disk Drive.

Hardware that brings together the processor 210, the memory 220, and the auxiliary storage device 230 is called "processing circuitry".

The communication device 240 is a device that performs communication and that includes a receiver and a transmitter. Specifically, the communication device 240 is a communication chip or a Network Interface Card (NIC).

The GW 110 includes a GW function unit 211 and an illegal communication detection unit 212 as function configuration elements and these functions can be implemented by software. This will be described below.

The function configuration elements included in the GW 110 will be indicated in the description of FIG. 2. The auxiliary storage device 230 stores programs that implement functions of the GW function unit 211 and the illegal communication detection unit 212. These programs are loaded into the memory 220 and implemented by the processor 210. In addition, the auxiliary storage device 230 stores an OS. At least a portion of the OS is loaded into the memory 220 and executed by the processor 210. That is, while executing the OS, the processor 210 executes the programs that implement the functions of the GW function unit 211 and the illegal communication detection unit 212. Data obtained by executing the programs is stored in a storage device such as the memory 220, the auxiliary storage device 230, a register in the processor 210, or a cache memory in the processor 210.

The memory 220 stores a communication permission list 221 and a transfer list 222. The communication permission list 221 is a whitelist including a detection rule used for determining whether a communication message received by the illegal communication detection unit 212 is normal or abnormal. The details of the communication permission list 221 will be described below in FIG. 4. The transfer list 222 is a list used for determining whether or not a communication message received by the GW function unit 211 need to be transferred to the other cable. The transfer list 222 is a list in which communication messages and transfer destination information on those communication messages are described. Since the transfer list 222 is not directly related to the illegal communication detection function according to the present invention, the detailed explanation is omitted. The communication permission list 221 and the transfer list 222 are stored in the auxiliary storage device 230 and are deployed from the auxiliary storage device 230 to the memory 220 when the GW 110 is activated. In addition to this, the memory 220 stores data not illustrated to be used, generated, input, output, transmitted, or received by the GW 110.

The communication device 240 functions as a communication unit to communicate data. In the communication device 240, the receiver functions as a reception unit 241 to receive data and the transmitter functions as a transmission unit 242 to transmit data.

The GW 110 may include a plurality of processors that replaces the processor 210. The plurality of processors shares execution of the programs that implement the functions of the GW function unit 211 and the illegal communication detection unit 212. The programs that implement the functions of the GW function unit 211 and the illegal communication detection unit 212 can be computer-readably stored in a non-volatile storage medium. The functions of the GW function unit 211 and the communication detection unit 212 may be implemented by firmware.

The GW function unit 211 that transfers communication messages is a primary function of the GW 110. While referring to the transfer list 222, a communication message received from the cable 120 (or the cable 121) is transferred to the cable 121 (or the cable 120).

The illegal communication detection unit 212 is provided with a communication acquisition unit 213, a communication determination unit 214, and an alert unit 215 and implements the illegal communication detection function according to the present invention.

FIG. 3 is a message format of a communication message of the CAN that flows through a network in the vehicle system 100 and is a target for detection by the illegal communication detection unit 212.

The communication message of the CAN includes an ID, a DLC, and a data field. The ID is a message number assigned to uniquely identify the communication message. The Data Length Code (DLC) indicates a data length of a following data field in bytes. The data filed is a field in which data to be used for an application is stored and is a maximum of 8 bites in the CAN communication. The data field consists of a plurality of signals. Each signal can have a data length of 1 to 64 bits. The details of the ID, the DLC, the data field, and each signal are defined for each vehicle system 100. The network in the vehicle system 100 is an example of a vehicle network.

FIG. 4 illustrates an example of a format and possible values of the communication permission list 221.

The communication permission list 221 is a whitelist in which information on normal CAN messages flowing through the network in the vehicle system 100 is described. A normal CAN message is an example of a normal communication message. The communication permission list 221 includes detection rules for detecting normal communication messages. There are a detection rule number, a status, an ID, a DLC, a signal condition, and a period condition as items constituting a detection rule included in the communication permission list 221. The detection rule number is a number sequentially assigned to uniquely identify each detection rule in the communication permission list 221. The status is a possible status of the GW 110 or the vehicle system 100. For example, there may be a status such as "parking", "running", or "diagnosing a fault". In the illegal communication detection function according to the present invention, it is possible to define a detection rule for each status. The ID and the DLC correspond to the ID and the DLC in the communication message of the CAN illustrated in FIG. 3. The signal condition defines a first bit, a length, a minimum value, and a maximum value of each signal in the communication message of the CAN illustrated in FIG. 3. The period condition defines a period of a message that is periodically transmitted. When defining the period condition, it is necessary to consider a period error that occurs during flowing through the network in the actual vehicle system 100 and to define the period condition within a value range of the period. That is, the period condition indicates a value range of period information indicating the period. In the example of FIG. 4, each of detection rule numbers 1, 2, 4, and 5 is a detection rule for detecting a message to be transmitted at a period of 100 milliseconds (ms). Then, the detection rule numbers 1, 2, 4, and 5 are detection rules that take a margin of 10% before and after 100 ms as the period condition in order to consider the period error and that determine a message to be normal if the period is within the range of 90 to 110 ms. Here, a detection rule number 3 is a message having no periodicity. In this case, the period condition is not defined. In the present example, although only five detection rules are illustrated in the communication permission list 221 for simplification, it is necessary to describe without omission, all information on normal CAN messages that possibly flow through the network in the vehicle system 100.

Figure 5:
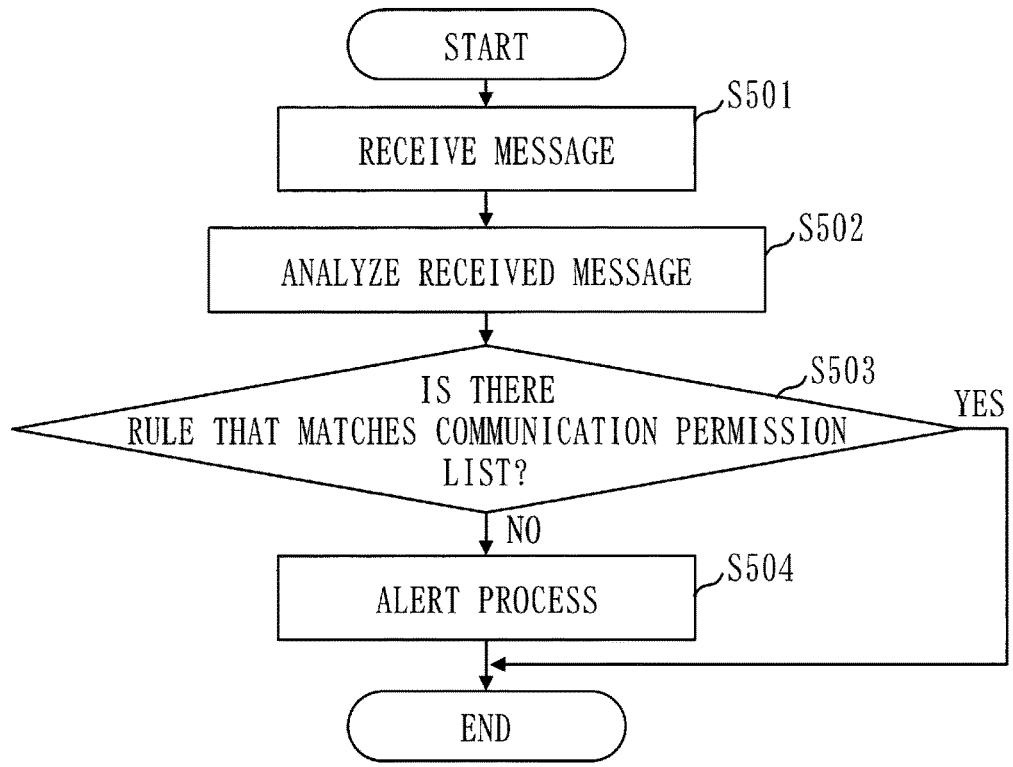
FIG. 5 is a flowchart of an illegal communication detection process operated by an illegal communication detection unit 212 according to the present invention.

FIG. 5 is a flowchart of an illegal communication detection process operated by the illegal communication detection unit 212 of the GW 110 according to the present invention.

In S501, the communication acquisition unit 213 of the illegal communication detection unit 212 acquires a communication message received by the reception unit 241 together with reception time information at the reception unit 241 and passes the received communication message and reception time information to the communication determination unit 214.

In S502, the communication determination unit 214 analyzes the content of the received communication message and acquires values of the ID, the DLC, and the data field included in the message.

In S503, it is determined whether or not there is a detection rule in the communication permission list 221 that matches an analysis result of the communication message. In a determination, a detection rule in which an ID condition and a DLC condition match the values acquired in S502, is searched for from among detection rules described in the communication permission list 221 and detection rules corresponding to a current status. When there is a matching detection rule, values of all signals described in the signal condition in the detection rule are read out from the data field depending on information on the first bit and the length and the read-out values are checked whether or not they are within a range of possible values. When the period condition is described in the detection rule, the reception time information passed in S501 is compared with previous reception time information relating to a communication message that has been internally held in advance and a reception interval is checked whether or not it is within a period range defined in the period condition. When there is a detection rule that matches all conditions, the message is determined to be normal and the flowchart immediately ends.

When there is no matching detection rule in the communication permission list 221 in the determination of S503, the process proceeds to S504 and an alert process determined in advance is operated by the alert unit 215. As the alert process, various processes can be performed such as transmitting via the transmission unit 242, log information indicating occurrence of an illegal communication to a log storage device not illustrated in the vehicle system 100, or notifying a passenger on the vehicle system 100 of a warning message displayed on an operation panel not illustrated. After executing the above process steps, the flowchart ends.

As described above, depending on the illegal communication detection process according to the present invention, when an illegal communication message that deceives the control relating to running or the like of a vehicle is transmitted from an illegal in-vehicle device or the like installed inside the vehicle, it is possible to detect the illegal communication message and raise an alert. In addition, the illegal communication detection process is a whitelist-type illegal communication detection function that defines information on normal communication messages so that there is an advantage in that the list does not need to be updated frequently compared with a blacklist-type illegal communication detection function. However, if there is an omission or a description error in normal communication messages to be described in a whitelist, appropriate detection cannot be performed. If the whitelist is manually created by humans, there is a high workload and is a possibility that an omission or a description error may occur. Therefore, a communication permission list generation tool is required to automatically generate the communication permission list 221 illustrated in FIG. 4.

Figure 6:
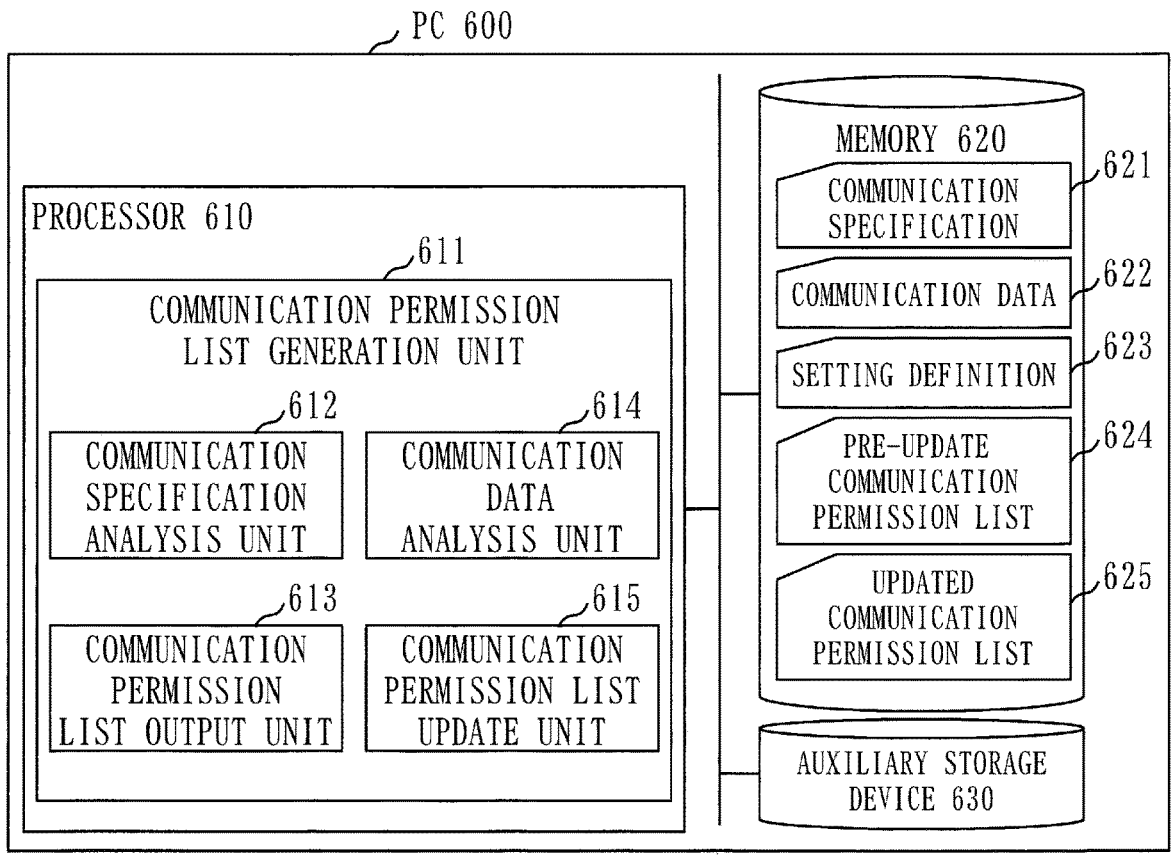
FIG. 6 is a configuration diagram of an operation environment of a communication permission list generation tool according to the present invention.

FIG. 6 is a configuration diagram of an operation environment of the communication permission list generation tool.

A PC 600 is a general-purpose Personal Computer (PC) including pieces of hardware such as a processor 610, a memory 620, and an auxiliary storage device 630. These pieces of hardware are connected to each other via signal lines. The PC 600 may be installed inside or outside the vehicle system 100.

The processor 610, the memory 620, and the auxiliary storage device 630 are hardware corresponding to the processor 210, the memory 220, and the auxiliary storage device 230 described in FIG. 2. The PC 600 includes a communication permission list generation unit 611 whose function can be implemented by software. This will be described below. The auxiliary storage device 630 stores a program that implements the function of the communication permission list generation unit 611. The program is loaded into the memory 620 and implemented by the processor 610. In addition, the auxiliary storage device 630 stores an OS. At least a portion of the OS is loaded into the memory 620 and executed by the processor 610. That is, while executing the OS, the processor 610 executes the program that implements the function of the communication permission list generation unit 611. Data obtained by executing the program is stored in a storage device such as the memory 620, the auxiliary storage device 630, a register in the processor 610, or a cache memory in the processor 610.

The memory 620 stores a communication specification 621, communication data 622, a setting definition 623, a pre-update communication permission list 624, and an updated communication permission list 625.

The communication specification 621 is a file that defines a communication specification including period information that defines a period of CAN messages flowing through the network in the vehicle system 100 illustrated in FIG. 1. The details of the communication specification 621 will be described below in FIG. 8.

The communication data 622 is a file in which a CAN message actually flowing through the network in the vehicle system 100 illustrated in FIG. 1 has been captured by a packet capture tool or the like and saved. The details of the communication data 622 will be described below in FIG. 9.

The setting definition 623 is a file that describes setting information in a case where the communication permission list generation unit 611 is operated. The details of the setting definition 623 will be described below in FIG. 10. The pre-update communication permission list 624 and the updated communication permission list 625 are files output by the communication permission list generation unit 611 and a format of those lists are the same as that of the communication permission list 221 illustrated in FIG. 4.

In addition to this, the memory 620 stores data not illustrated to be used, generated, input, output, transmitted, or received by the PC 600. The PC 600 may include a plurality of processors that replaces the processor 610. The plurality of processors shares execution of the program that implements the function of the communication permission list generation unit 611. The program that implements the function of the communication permission list generation unit 611 can be computer-readably stored in a non-volatile storage medium.

The communication permission list generation unit 611 is provided with a communication specification analysis unit 612, a communication permission list output unit 613, a communication data analysis unit 614, and a communication permission list update unit 615 and operates as the communication permission list generation tool according to the present invention. The communication permission list generation unit 611 is one of applications running on the PC 600. The communication permission list generation unit 611 is an example of a communication permission list generation device.

Figure 7:
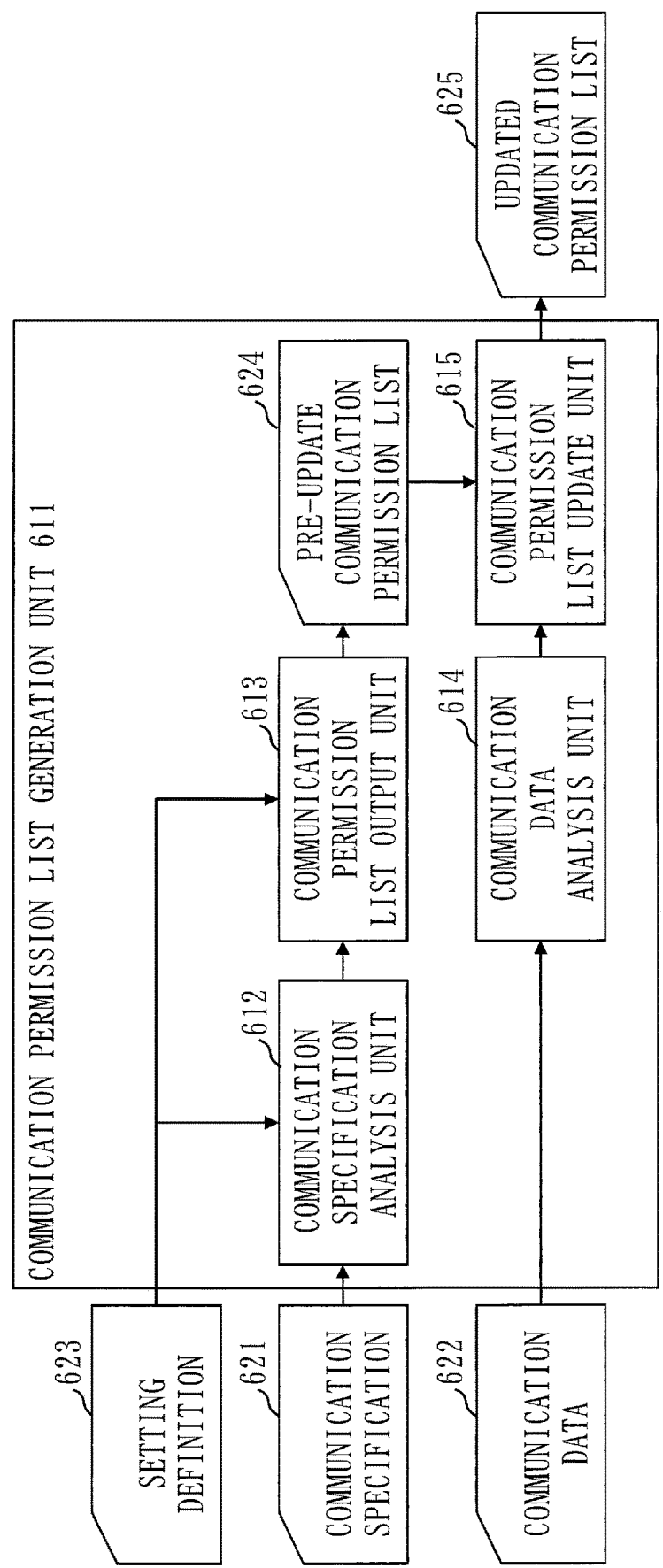
FIG. 7 is a flow diagram relating to internal operation of and input/output information on a communication permission list generation unit 611 according to the present invention.

FIG. 7 is a flow diagram relating to internal operation of and input/output information on the communication permission list generation unit 611 illustrated in FIG. 6.

The communication permission list generation unit 611 receives the communication specification 621, the setting definition 623, and the communication data 622 as input and outputs the updated communication permission list 625. Further, the pre-update communication permission list 624 is generated inside the communication permission list generation unit 611. Therefore, the pre-update communication permission list 624 and the updated communication permission list 625 are examples of a communication permission list to be generated by the communication permission list generation unit 611.

Inside the communication permission list generation unit 611, the communication specification analysis unit 612 analyzes the content of the communication specification 621 that defines a specification of normal communication messages flowing through the vehicle network and generates from the communication specification 621, a detection rule including period information that defines a period of a communication message. Here, the communication specification analysis unit 612 may analyze the content of the communication specification 621 based on the setting definition 623. In this case, the communication specification analysis unit 612 may define period information in which a lower limit value and an upper limit value of a period value range are calculated at a rate specified in the period range of the setting definition 623. An analysis result of the communication specification analysis unit 612 is passed to the communication permission list output unit 613 as a detection rule. Further, the communication specification analysis unit 612 may generate from the communication specification 621, a detection rule including priority of a communication message.

Figure 15:
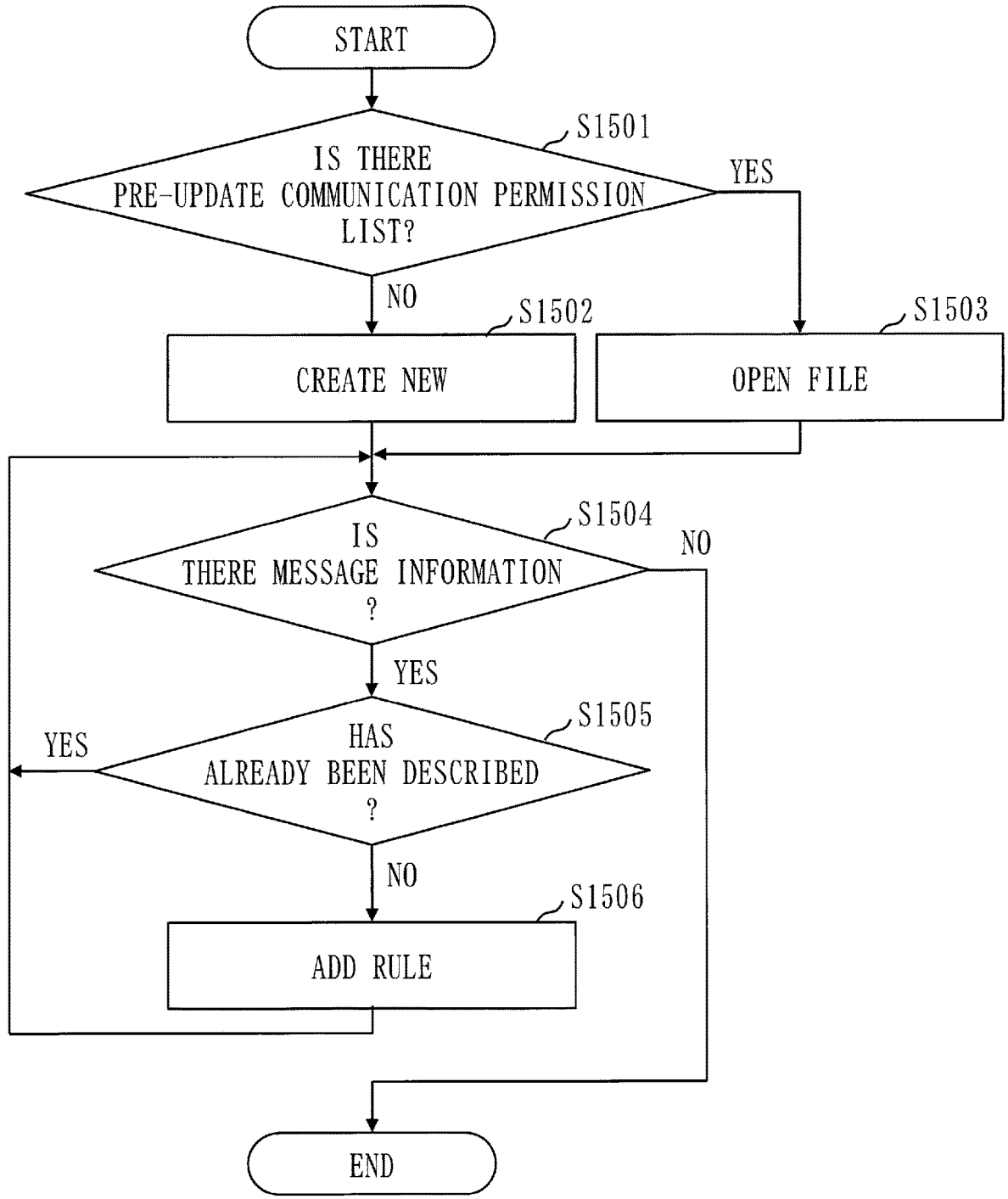
FIG. 15 is a flowchart of a communication permission list output process operated by a communication permission list output unit 613 according to the present invention.

The communication permission list output unit 613 generates the pre-update communication permission list 624 including a detection rule generated by the communication specification analysis unit 612. Here, the communication permission list output unit 613 may generate the pre-update communication permission list 624 in which period information in the detection rule has been updated depending on the content of the setting definition 623. In the flowchart of FIG. 15, an example will be described in which the communication permission list output unit 613 generates the pre-update communication permission list 624 in which the period information in the detection rule is updated depending on the content of the setting definition 623.

The communication data analysis unit 614 analyses the content of the communication data 622 acquired from the vehicle network and acquires from the communication data 622, a period range indicating a range of a period of a communication message. An analysis result including the period range is passed to the communication permission list update unit 615.

The communication permission list update unit 615 updates, based on the period range of the communication message acquired by the communication data analysis unit 614, the period information in the detection rule for the communication message included in the pre-update communication permission list 624. Further, the communication permission list update unit 615 outputs the pre-update communication permission list 624 as the updated communication permission list 625. Further, when there is a detection rule for a communication message for which the period information has not been updated in the pre-update communication permission list 624, the communication permission list update unit 615 selects as a reference message, another communication message for which the period information has been updated and based on a period range of the selected reference message, updates the period information in the detection rule for the communication message. Here, the updated communication permission list 625 output from the communication permission list update unit 615 is an example of a commutation permission list.

Here, the communication permission list generation unit 611 may output the pre-update communication permission list 624 as not just internal information. In this case, the communication permission list generation unit 611 outputs the pre-update communication permission list 624 together with the updated communication permission list 625. Further, the communication permission list generation unit 611 may store in the memory 620 or the auxiliary storage device 630, the updated communication permission list 625 as internal information.

In addition, the communication permission list generation unit 611 is divided into a function unit including the communication specification analysis unit 612 as well as the communication permission list output unit 613 and a function unit including the communication data analysis unit 614 as well as the communication permission list update unit 615. Each function unit may operate as a separate tool. In this case, the function unit including the communication specification analysis unit 612 as well as the communication permission list output unit 613 receives the communication specification 621 and the setting definition 623 as input and outputs the pre-update communication permission list 624. The function unit including the communication data analysis unit 614 as well as the communication permission list update unit 615 receives the communication data 622 and the pre-update communication permission list 624 as input and outputs the updated communication permission list 625.

FIG. 8 is an example of a format of the communication specification 621 illustrated in FIG. 6 and FIG. 7.

The communication specification 621 is a CAN database file that defines a specification of a plurality of normal CAN messages flowing through the network in the vehicle system 100. Here, the network in the vehicle system 100 is an example of a vehicle network. Further, a normal CAN message is an example of a normal communication message. The communication specification 621 is design information created and used at the development stage of each in-vehicle device such as the vehicle system 100, the Gateway (GW) 110, the first in-vehicle device 111, the second in-vehicle device 112, the third in-vehicle device 113, or the fourth in-vehicle device 114. The communication specification 621 is not a single file but may be a plurality of files.

The communication specification 621 includes information that defines a specification of normal communication messages, such as device information, message information, signal information that constitutes a message, message type information, and message period information (an example of the period information). The device information is a name of an in-vehicle device relating to transmitting and receiving messages defined in the communication specification 621. The message information is information on a message ID, a DLC, a transmission source in-vehicle device name, and the like relating to each message. Each message information includes signal information that constitutes a part of the data field of the message. The signal information is information relating to a signal name, a start bit, a length, possible values and the like. The message type information is information relating to a type of each message defined in the message information. As the message type, there is a message to be transmitted by an event trigger, a message to be periodically transmitted, or the like. The message period information is information relating to a transmission period of a message defined in the message type information, as a message having a period.

Figure 9:
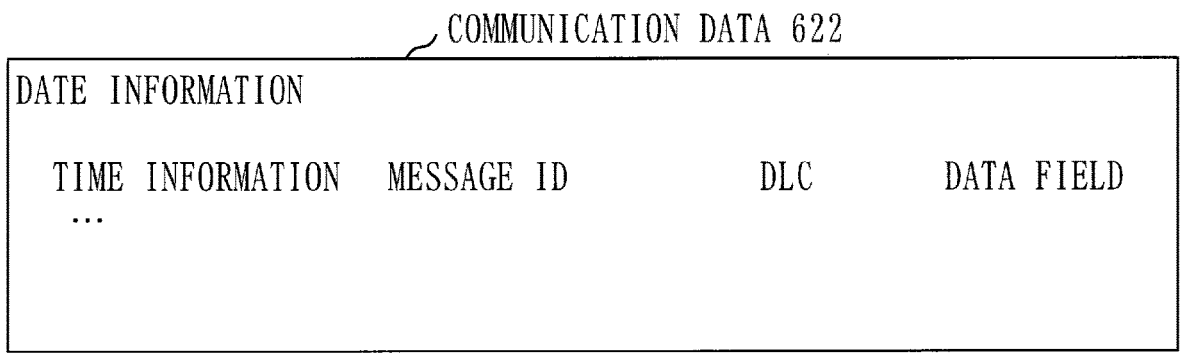
FIG. 9 is an example of a format of communication data 622 according to the present invention.

FIG. 9 is an example of a format of the communication data 622 illustrated in FIG. 6 and FIG. 7.

The communication data 622 is a file in which a CAN message flowing through the network in the vehicle system 100 is captured by a packet capture tool or the like and is saved. The communication specification 621 is information for development and evaluation proposes, that is acquired in a real vehicle or a simulator environment at the development stage of each in-vehicle device such as the vehicle system 100, the Gateway (GW) 110, the first in-vehicle device 111, the second in-vehicle device 112, the third in-vehicle device 113, or the fourth in-vehicle device 114. The communication data 622 may be a plurality of files instead of a single file. The communication data 622 includes information relating to date information and the captured message. The information relating to the message is a captured time, a message ID, a DLC, and a data field.

Figure 10:
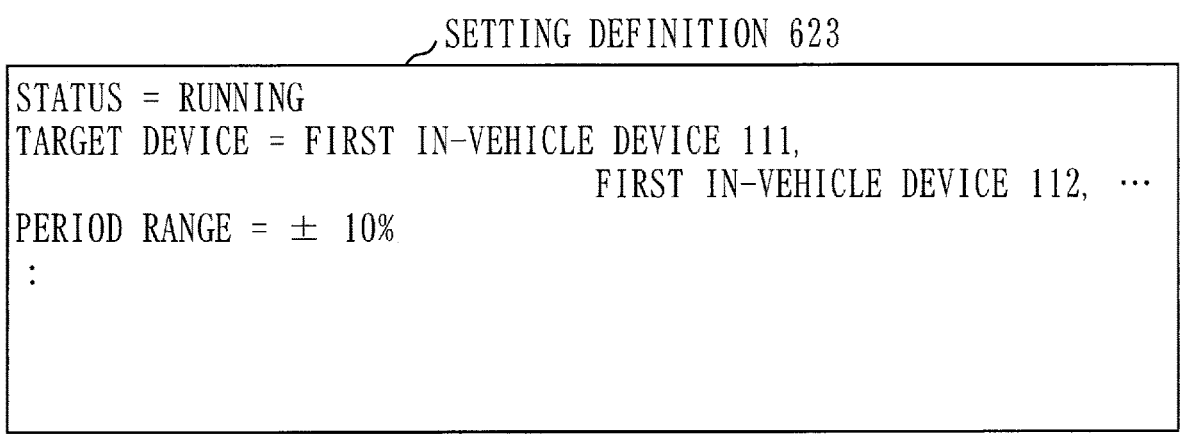
FIG. 10 is an example of a format of a setting definition 623 according to the present invention.

FIG. 10 is an example of a format of the setting definition 623 illustrated in FIG. 6 and FIG. 7.

The setting definition 623 is a text file that defines setting information relating to operation of the communication permission list generation unit 611. The setting definition 623 includes information relating to a status, a target device, and a period range. The status defines the item of the communication permission list 221 illustrated in FIG. 4, which is the content to be set to the status. The target device defines a transmission source in-vehicle device of a communication message to be analyzed by the communication specification analysis unit 612. Only a detection rule relating to a communication message to be transmitted by the in-vehicle device defined for the target device, is defined in the pre-update communication permission list 624 output by the communication permission list output unit 613. It is possible to omit the definition of the target device. In this case, all communication messages defined in the communication specification 621 are subject to be analyzed by the communication specification analysis unit 612. The period range is a rate that specifies how much margin is necessary for period information defined in the communication specification 621 to define the period condition of the pre-update communication permission list 624. The rate defined in the period range is applied to all periodic messages defined in the communication specification 621.

Figure 11:
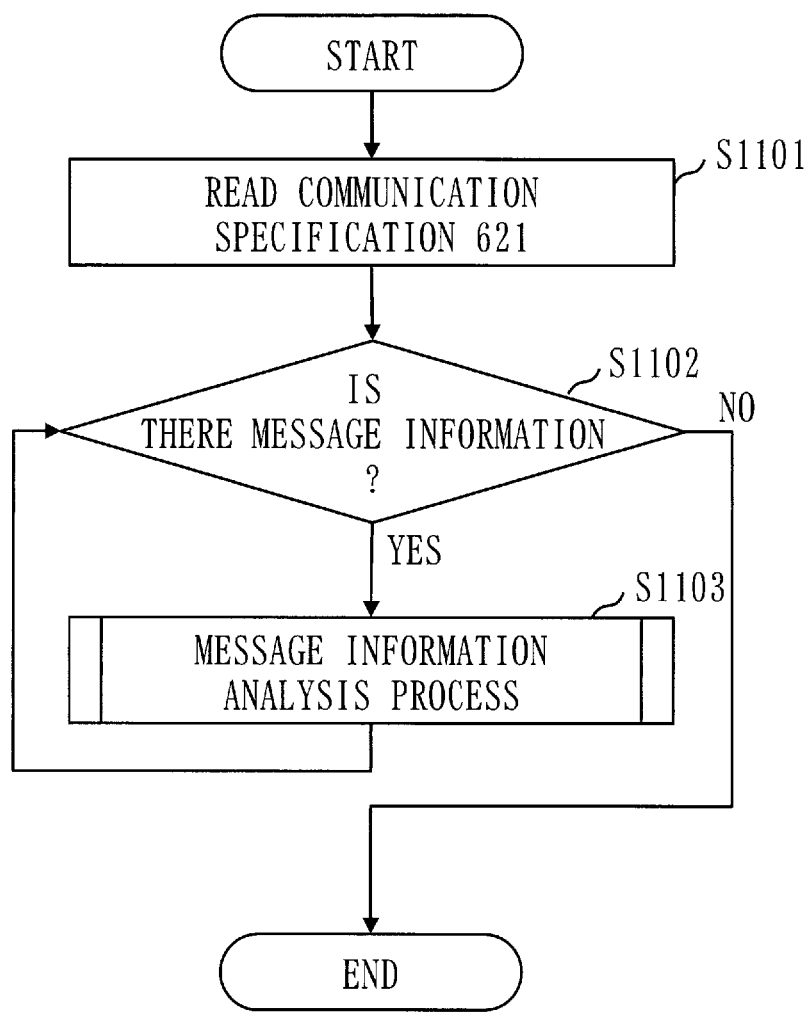
FIG. 11 is a flowchart of a communication specification analysis process operated by a communication specification analysis unit 612 according to the present invention.

FIG. 11 is a flowchart of a communication specification analysis process operated by the communication specification analysis unit 612 illustrated in FIG. 6 and FIG. 7.

In S1101, the communication specification analysis unit 612 of the communication permission list generation unit 611 reads the content of the communication specification 621 received as input. Specifically, message information is searched for from the beginning of the format of the communication specification 621 illustrated in FIG. 8. Then, in S1102, it is determined whether or not there is message information.

In S1103, when there is message information, a subroutine for a message information analysis process is executed. The message information analysis subroutine will be described below in FIG. 12. After executing the message information analysis subroutine, the process returns to S1102. Subsequently, steps S1102 to S1103 of the process are repeated until when all messages in the communication specification 621 are analyzed.

In S1102, when it is determined that there is no next message information, the flowchart ends.

Figure 12:
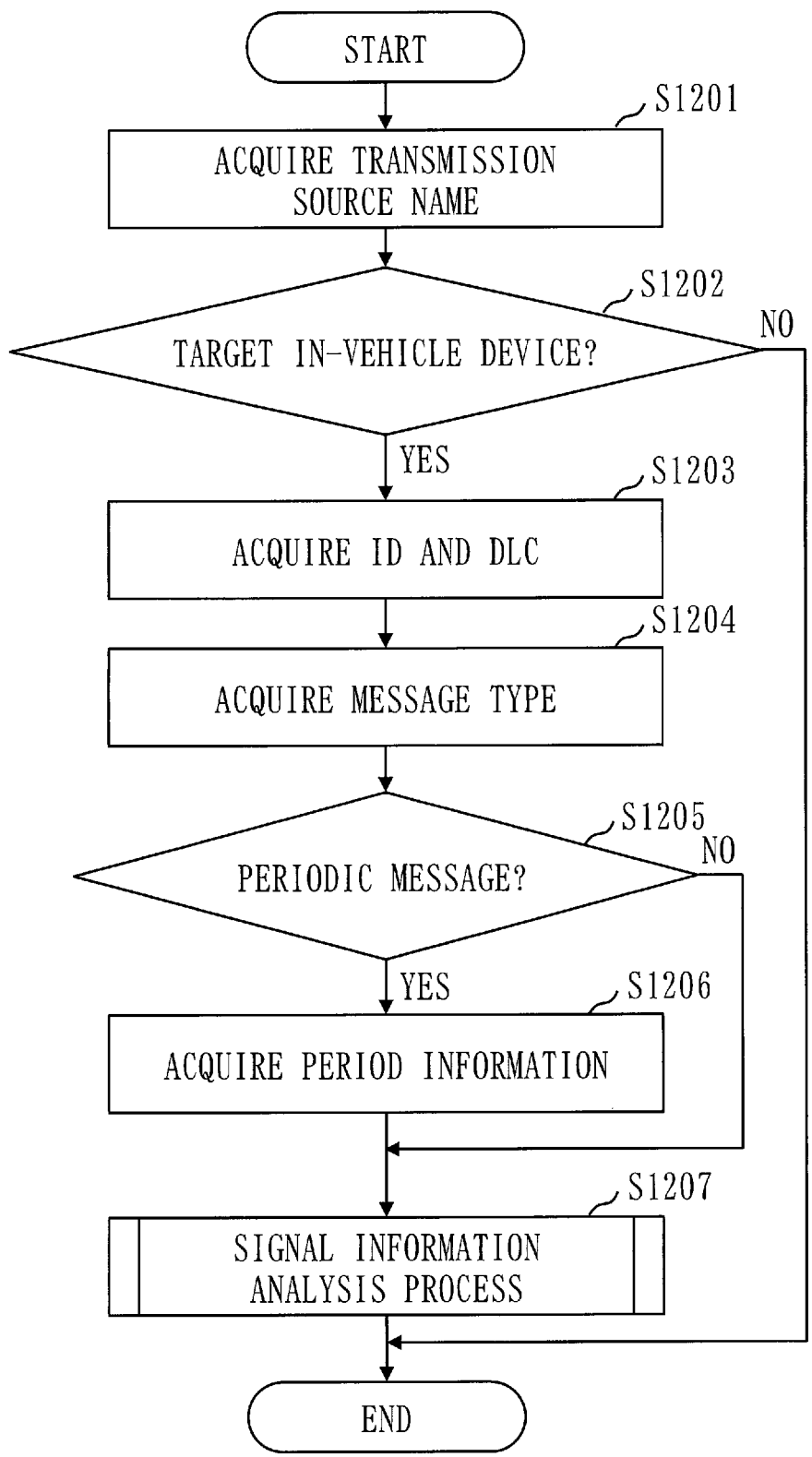
FIG. 12 is a flowchart of a message information analysis subroutine operated by the communication specification analysis unit 612 according to the present invention.

FIG. 12 is a flowchart of the message information analysis subroutine operated by the communication specification analysis unit 612 illustrated in FIG. 6 and FIG. 7. FIG. 12 corresponds to S1103 of FIG. 11.

In S1201, the communication specification analysis unit 612 of the communication permission list generation unit 611 acquires from the communication specification 621, the transmission source in-vehicle device name of message information to be analyzed.

In S1202, it is determined whether or not the transmission source in-vehicle device name acquired in S1201 is defined as the target device of the setting definition 623 illustrated in FIG. 10. When it is not defined, the flowchart immediately ends. When it is defined, the ID and the DLC of the message information to be analyzed are acquired from the communication specification 621 in S1203.

In S1204, the message type of the message information to be analyzed is acquired from the communication specification 621. Then, in S1205, it is determined whether or not the message information to be analyzed is a periodic message. When it is a periodic message, the period information in the message to be analyzed is acquired from the communication specification 621 in S1206. Then, in S1207, a subroutine for a signal information analysis process is executed. The signal information analysis subroutine will be described below in FIG. 13. On the other hand, in S1205, when the message information to be analyzed is not a periodic message, the process immediately proceeds to S1207 and the signal information analysis subroutine is executed. After executing the above steps of the process, the flowchart ends.

Figures 13, 14:
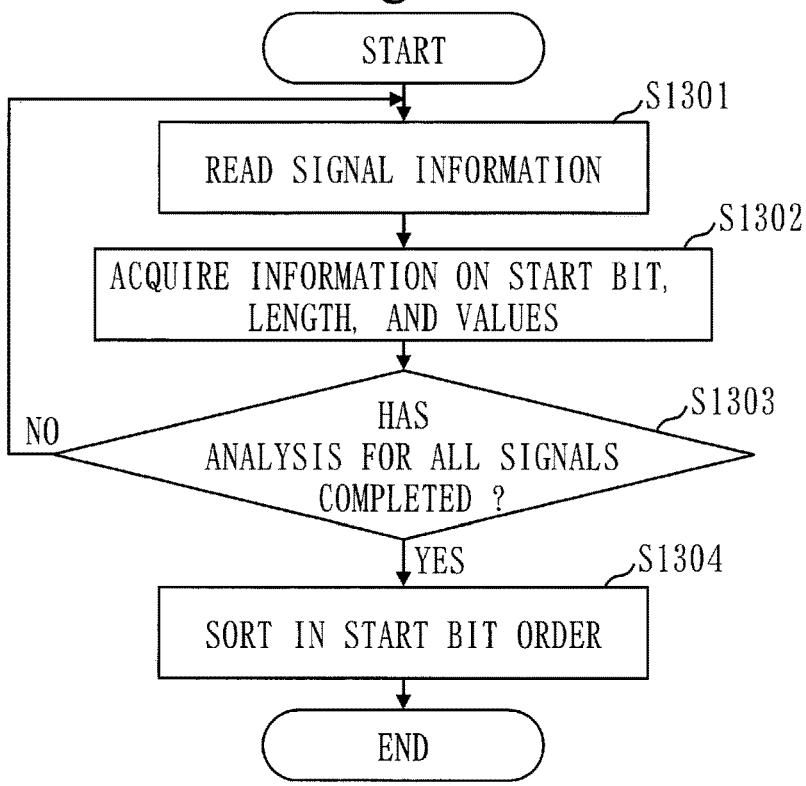
FIG. 13 is a flowchart of a signal information analysis subroutine operated by the communication specification analysis unit 612 according to the present invention.
FIG. 14 is an example of an internally generated file 1400 according to the present invention.

FIG. 13 is a flowchart of the signal information analysis subroutine operated by the communication specification analysis unit 612 illustrated in FIG. 6 and FIG. 7. FIG. 13 corresponds to S1207 of FIG. 12.

In S1301, the communication specification analysis unit 612 of the communication permission list generation unit 611 reads from the communication specification 621, signal information in the message information to be analyzed.

In S1302, information on a start bit, a length, and possible values (a minimum value and a maximum value) is acquired from the signal information.

In S1303, it is determined whether or not the analysis for all signal information relating to the message information to be analyzed has been completed. When the analysis has not been completed, the process returns to S1301. Subsequently, steps S1301 to S1303 of the process are repeated until when there is no unanalyzed signal information.

When the analysis for all signal information relating to the message information to be analyzed has been completed in S1303, information on each signal acquired in S1302 is sorted in the ascending order of the start bit in S1304.

FIG. 14 is an example of an internally generated file 1400 to be generated as a result of analysis processes by the communication specification 621 of the communication specification analysis unit 612 illustrated in FIG. 11 to FIG. 13.

The internally generated file 1400 is information that is used inside the communication permission list generation unit 611, as input from the communication specification analysis unit 612 to the communication permission list output unit 613.

The internally generated file 1400 includes an ID, a DLC, a signal condition, and a period condition. The ID and the DLC store information acquired in S1203 of FIG. 12. The signal condition includes a start bit, a length, a minimum value, and a maximum value, all of which store information acquired in S1302 of FIG. 13. As a result of executing the sorting process in S1304 of FIG. 13, the signal condition for each ID is recorded in the internally generated file 1400 in the ascending order of a value of the start bit. The period condition stores information acquired in S1206 of FIG. 12 when the message information to be analyzed is a periodic message. In FIG. 14, as an example, it is assumed that the same message information as the content exemplified in the communication permission list 221 in FIG. 4 is recorded.

FIG. 15 is a flowchart of a communication permission list output process operated by the communication permission list output unit 613 illustrated in FIG. 6 and FIG. 7.

In S1501, the communication permission list output unit 613 of the communication permission list generation unit 611 determines whether or not there is already the pre-update communication permission list 624. When there is no pre-update communication permission list 624, a new pre-update communication permission list 624 is created in S1502. A format of the pre-update communication permission list 624 is the same as that of the communication permission list 221 illustrated in FIG. 4. After executing the step S1502 of the process, the process proceeds to S1504.

On the other hand, when there is already the pre-update communication permission list 624 in S1501, the process proceeds to S1504 after opening the file in S1503 so that the existing pre-update communication permission list 624 can be edited.

In S1504, it is determined whether or not there is message information in the internally generated file 1400. When there is message information, it is determined in S1505 whether or not there is already in the pre-update communication permission list 624, a detection rule corresponding to the message information in the internally generated file 1400. Specifically, the ID of a target message is acquired from the internally generated file 1400 and it is determined whether or not there is a detection rule having the same ID in the pre-update communication permission list 624. When there is the detection rule, it is determined whether or not the DLC, the signal condition, and the period condition in the internally generated file 1400 match the DLC, the signal condition, and the period condition in the detection rule in the corresponding pre-update communication permission list 624. When they match, it is determined that there is the detection rule having the same ID in the pre-update communication permission list 624 and the process returns to S1504.

When there is no detection rule having the same ID in the pre-update communication permission list 624 in S1505, information on the ID, the DLC, the signal condition, and the period condition in the internally generated file 1400 is recorded in S1506 on the last line of the pre-update communication permission list 624. At this time, when the message has the period condition, a lower limit value and an upper limit value calculated by applying the rate specified as the period range in the setting definition 623 illustrated in FIG. 10 to the period condition in the internally generated file 1400, are recorded as the period condition in the pre-update communication permission list 624. For example, when the period condition is 100 ms in the internally generated file 1400 and the period range is specified as 10% in the setting definition 623, the period condition in the pre-update communication permission list 624 is calculated to be 90 to 110 ms. Subsequently, the process returns to S1504.

Subsequently, steps S1504 to S1506 of the process are repeated until when all message information in the internally generated file 1400 are read out.

In S1504, when there is no next message information in the internally generated file 1400, the flowchart ends. The content of the pre-update communication permission list 624 to be generated in a case where the communication permission list output process illustrated in FIG. 15 is executed with the content of the internally generated file 1400 illustrated in FIG. 14 as input, is the same as the content of the communication permission list 221 illustrated in FIG. 4.

Figures 16, 17:
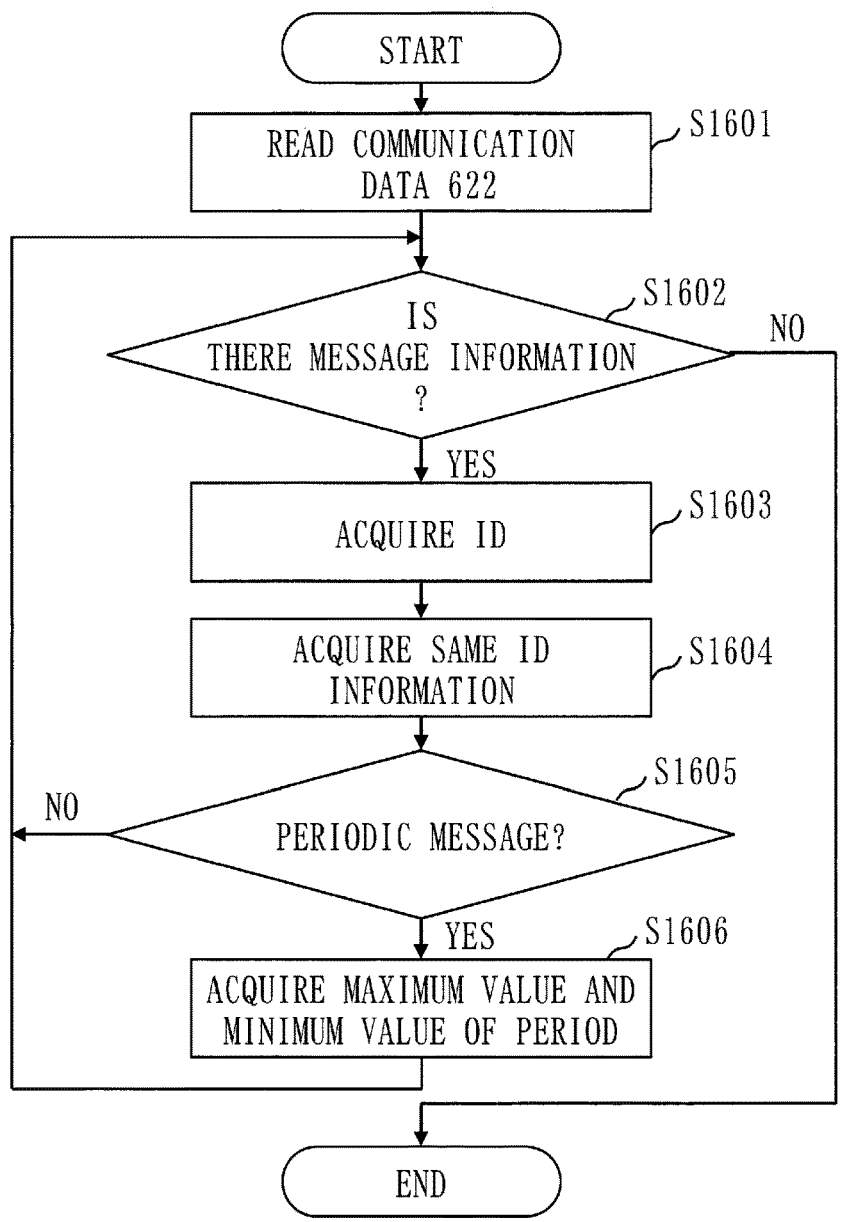
FIG. 16 is a flowchart of a communication data analysis process operated by a communication data analysis unit 614 according to the present invention.
FIG. 17 is an example of an internally generated file 1700 according to the present invention.

FIG. 16 is a flowchart of a communication data analysis process operated by the communication data analysis unit 614 illustrated in FIG. 6 and FIG. 7.

In S1601, the communication data analysis unit 614 of the communication permission list generation unit 611 reads the content of the communication data 622 received as input. Specifically, message information is searched for from the beginning of the format of the communication data 622 illustrated in FIG. 9. Then, it is determined in S1602 whether or not there is an unanalyzed message. When there is an unanalyzed message, the ID of the message to be analyzed is acquired in S1603. In S1604, the communication data 622 is further searched to acquire information relating to the same ID. In S1605, intervals of captured times for each information are calculated from the acquired information and it is determined whether or not the message information to be analyzed is a periodic message. When there is no regularity in the intervals of the captured times and it is determined that the message is not a periodic message, the process returns to S1602.

On the other hand, when it is determined that the message is a periodic message, a maximum value and a minimum value of a period range are acquired in S1606, from the calculated intervals of the captured times. After that, the process returns to S1602. Subsequently, steps S1602 to S1606 of the process are repeated until when there is no unanalyzed message in the communication data 622. In S1602, when all message information in the communication data 622 has been analyzed, the flowchart ends.

FIG. 17 is an example of an internally generated file 1700 to be generated as a result of the communication data analysis process by the communication data analysis unit 614 illustrated in FIG. 16.

The internally generated file 1700 is information that is used inside the communication permission list generation unit 611, as input from the communication data analysis unit 614 to the communication permission list update unit 615. The internally generated file 1700 includes an ID and a period range. The ID stores information acquired in S1603 of FIG. 16. The period range includes a minimum range and a maximum range, both of which store information acquired in S1606 of FIG. 16. In FIG. 17, for example, it is assumed that the period range of the ID=0×20 and 0×40 can be acquired as the result of the communication data analysis process by the communication data analysis unit 614 illustrated in FIG. 16. Further, the period range of the ID=0×20 is assumed to be a minimum of 98.4 ms and a maximum of 104.5 ms. The period range of the ID=0×40 is assumed to be a minimum of 93.8 ms and a maximum of 110.3 ms.

Figure 18:
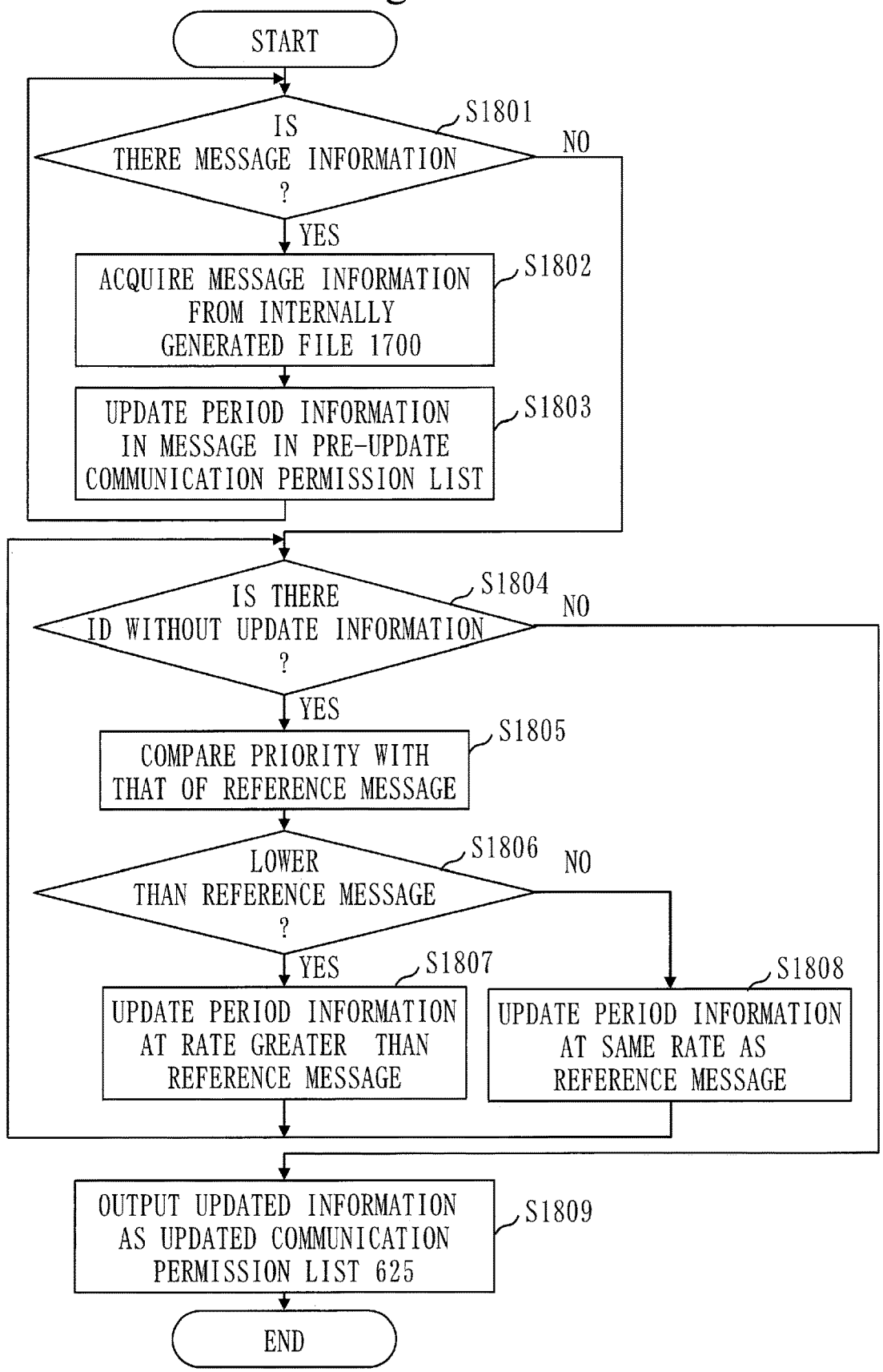
FIG. 18 is a flowchart of a communication permission list update process operated by a communication permission list update unit 615 according to the present invention.

FIG. 18 is a flowchart of a communication permission list update process operated by the communication permission list update unit 615 illustrated in FIG. 6 and FIG. 7.

In S1801, the communication permission list update unit 615 of the communication permission list generation unit 611 searches from the beginning of the internally generated file 1700 to check whether or not there is message information. When there is message information (Yes in S1801), information on the ID and the period range of a message is acquired in S1802. In S1803, the pre-update communication permission list 624 is searched to identify a detection rule having ID information that matches the ID acquired in S1802. The period condition (a value range of period information) in the identified detection rule is updated based on the information on the period range acquired in S1802. That is, the communication permission list update unit 615 updates, based on the period range of the communication message acquired by the communication data analysis unit 614, the value range of the period information in the detection rule for the communication message included in the pre-update communication permission list 624.

In the present example, information relating to the message with the ID=0×20 is recorded at the beginning of the internally generated file 1700 illustrated in FIG. 17 and its period range is a minimum of 98.4 ms and a maximum of 104.5 ms. On the other hand, the content of the pre-update communication permission list 624 is the same as the content of the communication permission list 221 illustrated in FIG. 4 and the period condition of the message with the ID=0×20 in the pre-update communication permission list 624 is 90 to 110 ms. Therefore, the period condition relating to message information (a detection rule for a communication message) with the ID=0×20 in the pre-update communication permission list 624 is updated to, for example, 98 to 105 ms so that the range is narrowed as much as possible within a range in which the minimum period and the maximum period in the internally generated file 1700 are housed. After that, the process returns to S1801. Subsequently, steps S1801 to S1803 of the process are repeated until when all message information in the internally generated file 1700 is acquired.

In the present example, based on information in the internally generated file 1700, the period condition relating to message information with the ID=0×40 in the pre-update communication permission list 624 is updated as well as the ID=0×20. For the ID=0×40, the period range in the internally generated file 1700 is a minimum of 93.8 ms and a maximum of 110.3 ms as illustrated in FIG. 17. On the other hand, the period condition in the pre-update communication permission list 624 is 90 to 110 ms as illustrated in FIG. 4. Therefore, the period condition of the message information in the pre-update communication permission list 624 is updated to, for example, 93 to 111 ms.

In S1801, when all message information in the internally generated file 1700 is acquired (No in S1801), it is checked in S1804 whether or not there is message information in which period information (an example of a detection rule for a communication message) has not been updated in steps S1801 to S1803 of the process, among periodic messages recorded in the pre-update communication permission list 624. In the present example, message information with the ID=0×10 and ID=0×50 is applicable.

In S1805, when there is message information in which period information has not been updated in the pre-update communication permission list 624, the communication permission list update unit 615 compares priority of the message information in which the period information has not been updated (hereinafter referred to as a target message) with priority of a reference message. The communication permission list update unit 615 selects as the reference message from among message information recorded in the internally generated file 1700, the ID in message information is close to the ID of the target message. That is, the communication permission list update unit 615 selects as the reference message, a communication message whose priority is close to that of a communication message for which the period information has not been updated. In the present example, each of reference messages is the ID=0×20 for the ID=0×10 and the ID=0×40 for the ID=0×50. Here, in the CAN communication, messages with a smaller ID have higher priority. Therefore, in S1805, the ID of the target message is compared with the ID of the reference message. The communication permission list update unit 615 may select as the reference message from among message information recorded in the pre-update communication permission list 624 for which the period condition has been updated, a message whose ID is close to the ID of the target message.

When the priority of the target message is lower than the priority of the reference message in S1805, that is, a value of the ID of the target message is greater than a value of the ID of the reference message, the period condition (a value range of period information) in the detection rule for the target message recorded in the pre-update communication permission list 624 is updated in S1807 at a rate greater than a rate of the period information in the reference message.

This is because when transmission timings of a plurality of messages collide with each other, messages with higher priority take precedence so that messages with lower priority have a greater period delay error.

In the present example, the ID=0×50 has lower priority than the priority of the ID=0×40 which is the reference message. Further, both of period conditions for the ID=0×40 and the ID=0×50 are 100 ms. Then, in S1803, the upper limit value of the period condition relating to the ID=0×40 in the pre-update communication permission list 624 has been updated to 111 ms. Therefore, for the ID=0×40 which is the reference message, the (maximum) rate of the period range is 111%. Therefore, the upper limit value of the period condition relating to the ID=0×50 in the pre-update communication permission list 624 is updated to 115 ms at a rate (for example, 115%) greater than the rate of the period range of the ID=0×40 (111%) which is the reference message. After that, the process returns to S1804.

On the other hand, in S1805, when the priority of the target message is the same as the priority of the reference message or when the priority of the communication message is greater than the priority of the reference message, the period condition (a value range of period information) in the detection rule for the target message recorded in the pre-update communication permission list 624 is updated in S1808 at the same rate as the rate of the period range of the reference message. In the present example, the ID=0×10 has higher priority than the priority of the ID=0×20 which is the reference message. The period condition is 100 ms for both of the ID=0×10 and the ID=0×20. Then, in S1803, the upper limit value of the period condition relating to the ID=0×20 in the detection rule in the pre-update communication permission list 624 has been updated to 105 ms. Therefore, for the ID=0×20 which is the reference message, the (maximum) rate of the period range is 105%. Therefore, the upper limit value of the period condition relating to the ID=0×10 in the pre-update communication permission list 624 is updated to 105 ms which is the same as that of the ID=0×20. After that, the process returns to S1804. Subsequently, steps S1804 to S1808 of the process are repeated until when all periodic messages in the pre-update communication permission list 624 are updated. When all periodic messages in the pre-update communication permission list 624 have been updated in S1804, updated information is output in S1809, as the updated communication permission list 625. After processing the above processes, the flowchart ends.

FIG. 19 is a diagram illustrating the content of the updated communication permission list 625 to be output by the communication permission list update unit 615 as a result of the communication permission list update process illustrated in FIG. 18. Values relating to the period condition in detection rules for periodic communication messages have been updated from the content of the pre-update communication permission list 624. In FIG. 19, underlined values are values updated from the pre-update communication permission list 624.

As described above, the communication permission list generation tool according to the present invention, it is possible to automatically generate from the communication specification 621 and information on actual communication data, the communication permission list 221 referred to by the illegal communication detection unit 212 of the GW 110. This makes it possible to create a detection rule with highly accuracy without occurrence of an omission or a description error, as compared with a case where the pre-update communication permission list 624 is manually created by humans. In addition, depending on the communication permission list generation tool according to the present invention, even for a period range of a periodic message that does not appear in a communication specification and actual communication data, it is possible to create a detection rule with highly accuracy with using information on another periodic message recorded in the communication data.

OTHER EMBODIMENTS

Other embodiments of the present invention will be described.

In S1805 of FIG. 18, a reference message may be selected based on conditions other than similarity to the ID of a target message. For example, the communication permission list update unit 615 may select as the reference message, another communication message for which period information has been updated and for which device information on a transmission source is equal to that for a communication message for which the period information has not been updated. In this case, the communication permission list update unit 615, which executes the flowchart in FIG. 18, needs to grasp the correspondence between the message ID and the transmission source in-vehicle device. Hence, the communication permission list update unit 615 according to the other embodiments takes the communication specification 621 as input, in addition to the internally generated file 1700 and the pre-update communication permission list 624. A method by which the communication permission list update unit 615 identifies the device information on the transmission source of the communication message is not limited to this. The ID of the communication message and the device information on the transmission source may be corresponded to each other or the device information on the transmission source may be included in a detection rule.

Figure 20:
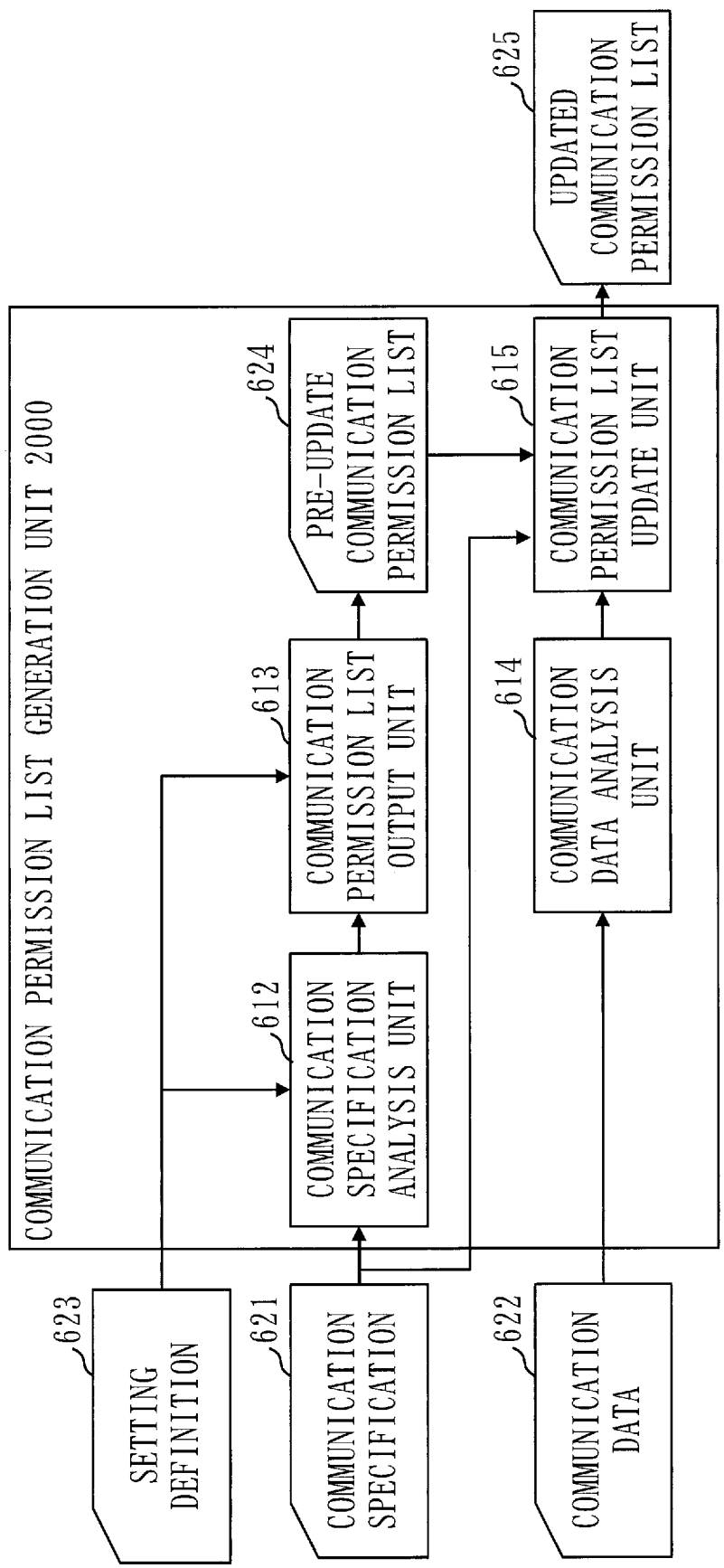
FIG. 20 is a flow diagram relating to internal operation of and input/output information on a communication permission list generation unit 2000 according to other embodiments of the present invention.

FIG. 20 is a flow diagram relating to internal operation of and input/output information on a communication permission list generation unit 2000 according to the other embodiments of the present invention. The communication permission list generation unit 2000 is another embodiment of the communication permission list generation unit 611 illustrated in FIG. 7. A difference from the communication permission list generation unit 611 illustrated in FIG. 7 is that the communication specification 621 is input to the communication permission list update unit 615. As a result, in S1805 of FIG. 18, when the communication permission list update unit 615 selects a reference message, it is possible to acquire from the communication specification 621, information on an in-vehicle device which is a transmission source of a message to be targeted. In addition, information on other messages transmitted by the in-vehicle device is acquired from the communication specification 621 to select the reference message. Since information on input/output of the communication permission list generation unit 2000 and each function that makes up an internal structure are the same as those in FIG. 7, the description is omitted here.

Further, in S1805 of FIG. 18, a reference message does not have to be one. A plurality of messages recorded in the internally generated file 1700 is used as reference messages. An expected maximum value of a period range of a message to be updated is calculated from the correspondence between the ID of the plurality of reference messages and the maximum value of the period range. The pre-update communication permission list 624 may be updated with the calculated value.

Supplement to Embodiments

The embodiments are examples of preferred embodiments and are not intended to limit the technical scope of the present invention. The embodiments may be partially implemented or may be implemented in combination with another embodiment. The procedures described with using the flowcharts or the like may be changed as appropriate.

The processes performed by the vehicle system 100 described above may be configured as a program to operate a computer.

REFERENCE SIGNS LIST

100: vehicle system; 110: GW; 111: first in-vehicle device; 112: second in-vehicle device; 113: third in-vehicle device; 114: fourth in-vehicle device; 120, 121: cable; 210: processor; 211: GW function unit; 212: illegal communication detection unit; 213: communication acquisition unit; 214: communication determination unit; 215: alert unit; 220: memory; 221: communication permission list; 222: transfer list; 230: auxiliary storage device; 240: communication device; 241: reception unit; 242: transmission unit; 600: PC; 610: processor; 611: communication permission list generation unit; 612: communication specification analysis unit; 613: communication permission list output unit; 614: communication data analysis unit; 615: communication permission list update unit; 620: memory; 621: communication specification 622: communication data; 623: setting definition; 624: pre-update communication permission list; 625: updated communication permission list; 630: auxiliary storage device; 1400, 1700: internally generated file; 2000: communication permission list generation unit.

The invention claimed is:
1. A communication permission list generation device to generate a communication permission list to be used by an illegal communication detection function that is installed in a vehicle network, characterized in that the communication permission list generation device comprising:

processing circuitry to:
generate from a communication specification that defines a specification of a normal communication message flowing through the vehicle network, a detection rule including period information that defines a period of the communication message;
generate a communication permission list including the detection rule generated;
analyze communication data acquired from the vehicle network and to acquire from the communication data, a period range indicating a range of the period of the communication message; and
update based on the period range of the communication message acquired, the period information in the detection rule for the communication message included in the communication permission list, wherein
when there is a detection rule for a communication message for which the period information has not been updated in the communication permission list, the processing circuitry selects as a reference message, another communication message for which the period information has been updated and based on a period range of the reference message, updates the period information in the detection rule for the communication message.

2. The communication permission list generation device according to claim 1, characterized in that
the processing circuitry generates from the communication specification, a detection rule including priority of a communication message, and
the processing circuitry selects as a reference message, a communication message whose priority is close to that of a communication message for which the period information has not been updated.

3. The communication permission list generation device according to claim 2, characterized in that
when the priority of the communication message is lower than the priority of the reference message, the processing circuitry updates at a rate greater than a rate of the period range of the reference message, a value range of the period information in the detection rule for the communication message.

4. The communication permission list generation device according to claim 3, characterized in that
when the priority of the communication message is a same as the priority of the reference message or when the priority of the communication message is higher than the priority of the reference message, the processing circuitry updates at a same rate as a rate of the period range of the reference message, a value range of the period information in the detection rule for the communication message.

5. The communication permission list generation device according to claim 4, characterized in that
the processing circuitry selects as a reference message, another communication message for which the period information has been updated and for which device information on a transmission source is equal to that for a communication message for which the period information has not been updated.

6. The communication permission list generation device according to claim 3, characterized in that
the processing circuitry selects as a reference message, another communication message for which the period information has been updated and for which device information on a transmission source is equal to that for a communication message for which the period information has not been updated.

7. The communication permission list generation device according to claim 2, characterized in that
when the priority of the communication message is a same as the priority of the reference message or when the priority of the communication message is higher than the priority of the reference message, the processing circuitry updates at a same rate as a rate of the period range of the reference message, a value range of the period information in the detection rule for the communication message.

8. The communication permission list generation device according to claim 7, characterized in that
the processing circuitry selects as a reference message, another communication message for which the period information has been updated and for which device information on a transmission source is equal to that for a communication message for which the period information has not been updated.

9. The communication permission list generation device according to claim 2, characterized in that
the processing circuitry selects as a reference message, another communication message for which the period information has been updated and for which device information on a transmission source is equal to that for a communication message for which the period information has not been updated.

10. The communication permission list generation device according to claim 1, characterized in that
the processing circuitry selects as a reference message, another communication message for which the period information has been updated and for which device information on a transmission source is equal to that for a communication message for which the period information has not been updated.

11. A communication permission list generation method to generate a communication permission list to be used by an illegal communication detection function that is installed in a vehicle network, the communication permission list generation method characterized in that:
a communication specification analysis step to generate from a communication specification that defines a specification of a normal communication message flowing through the vehicle network, a detection rule including period information that defines a period of the communication message;
a communication permission list output step to generate a communication permission list including the detection rule generated by the communication specification analysis step;
a communication data analysis step to analyze communication data acquired from the vehicle network and to acquire from the communication data, a period range indicating a range of the period of the communication message; and
a communication permission list update step to update based on the period range of the communication message acquired by the communication data analysis step, the period information in the detection rule for the communication message included in the communication permission list and when there is a detection rule for a communication message for which the period information has not been updated in the communication permission list, to select as a reference message, another communication message for which the period information has been updated and based on a period range of the reference message, to update the period information in the detection rule for the communication message.

12. A non-transitory computer readable-medium storing a program to generate a communication permission list to be used by an illegal communication detection function that is installed in a vehicle network, the program for causing a computer to execute:
- a communication specification analysis step to generate from a communication specification that defines a specification of a normal communication message flowing through the vehicle network, a detection rule including period information that defines a period of the communication message;
- a communication permission list output step to generate a communication permission list including the detection rule generated by the communication specification analysis step;
- a communication data analysis step to analyze communication data acquired from the vehicle network and to acquire from the communication data, a period range indicating a range of the period of the communication message; and
- a communication permission list update step to update based on the period range of the communication message acquired by the communication data analysis step, the period information in the detection rule for the communication message included in the communication permission list and when there is a detection rule for a communication message for which the period information has not been updated in the communication permission list, to select as a reference message, another communication message for which the period information has been updated and based on a period range of the reference message, to update the period information in the detection rule for the communication message.

* * * * *